United States Patent [19]

Miwa

[11] Patent Number: 5,649,400
[45] Date of Patent: Jul. 22, 1997

[54] SUPPORT STRUCTURE FOR SUPPORTING FOAMABLE MATERIAL ON HOLLOW STRUCTURAL MEMBER

[75] Inventor: Norimichi Miwa, Toyota, Japan

[73] Assignee: Neo-Ex Lab, Inc., Toyota, Japan

[21] Appl. No.: 699,351

[22] Filed: Aug. 19, 1996

[30] Foreign Application Priority Data

Aug. 24, 1995 [JP] Japan .................................. 7-215941

[51] Int. Cl.⁶ ........................................................ E04B 1/74
[52] U.S. Cl. ......................... 52/406.1; 52/783.1; 156/79
[58] Field of Search ............................ 52/406.1, 309.5, 52/309.8, 309.9, 742.1, 742.13; 156/79; 248/205.5, 206.3, 362

[56] References Cited

U.S. PATENT DOCUMENTS 4,668,555  5/1987  Uekado et al. ..................... 156/79 X
4,988,406  1/1991  Nelson ................................ 156/292 X Primary Examiner—Wynn E. Wood
Assistant Examiner—Yvonne Horton-Richardson
Attorney, Agent, or Firm—Dennison, Meserole, Pollack & Scheiner

[57] ABSTRACT

A support structure including a foamable material located in a cavity of a hollow structural member for blocking the cavity of the hollow structural member when it is foamed and expanded by external heating, and at least one sucking disk provided on at least one side of the foamable material. The sucking disk sticking to an inner surface of the hollow structural member so that the foamable material is fixed in the cavity of the hollow structural member.

4 Claims, 4 Drawing Sheets

SUPPORT STRUCTURE FOR SUPPORTING FOAMABLE MATERIAL ON HOLLOW STRUCTURAL MEMBER

BACKGROUND OF THE INVENTION

1. Field of the Invention

The present invention relates to a support structure for supporting a foamable material on a hollow structural member, and more particularly to a support structure for supporting a foamable material in a cavity of a closed box-like hollow structural member constituted of a plurality of pieces of plates, such as pillars, rocker panels, roof side panels and hood panels of a vehicle body, in order that the foamable material blocks the cavity of the hollow structural member to increase damping powers, sound insulation powers and other powers of the hollow structural member when it is foamed by external heating.

2. Description of the Prior Art

FIG. 6 exemplarily shows a conventional support structure. In this support structure, to support a foamable material 121 in a cavity 106 of a pillar 101 as a hollow structural member which is constituted of an inner pillar panel 102 and an outer pillar panel 104, a bolt 111 having a threaded section 111a is mounted on the inner pillar panel 102 so that the threaded section 111a projects into the cavity 106 for a desired length. The threaded section 111a is then provided with a washer 120. The foamable material 121 threadably engages the threaded section 111a so as to be seated on the washer 120. Thus, the foamable material 121 is supported in a cavity 106 of the pillar 101.

Such a support structure of the foamable material as described above is disclosed, for example, in Japanese Laid-Open Patent Publication No. 2-276836 (corresponding to British Patent Application No. 8903211.4).

In the above-noted conventional support structure of the foamable material in which the foamable material 121 engages the threaded section 111a of the bolt 111 which projects into the cavity 106 of the pillar 101, the inner panel 102 has to be previously formed with a mounting aperture 107 which may receive the bolt 111 is inserted. Also, the foamable material 121 has to be formed with a threaded bore 125 which may threadably engage the threaded section 111a of the bolt 111. Thus, it takes a lot of labor to support the formable material 121 in the cavity 106 of the pillar 101. This may lead to increased costs.

SUMMARY OF THE INVENTION

It is an object of the invention to provide a support structure for supporting a foamable material in a cavity of a hollow structural member in which the problems associated with the conventional support structure can be eliminated, that is, the foamable material can be easily and reliably supported in a desired position in the cavity without forming a mounting aperture in the hollow structural member.

In order to attain the object, the present invention provides a support structure including a foamable material located in a cavity of a hollow structural member for blocking the cavity of the hollow structural member when it is foamed and expanded by external heating, and at least one sucking disk provided on at least one side of the foamable material. The sucking disk sticks to an inner surface of the hollow structural member so that the foamable material is fixed in the cavity of the hollow structural member.

With this support structure, the foamable material is effectively retained in the cavity of the hollow structural member by the sucking disk. As a result, the foamable material can be speedily and surely supported in a desired position in the cavity without forming an aperture in the hollow structural member. This may lead to reduced costs.

The at least one sucking disk may be two in number. The respective sucking disks may be provided on opposed sides of the foamable material. With this construction, the foamable material is more stably supported in the cavity of the hollow structural member.

In addition, the at least one sucking disk may be formed integrally with the foamable material. Further, the at least one sucking disk may be formed separately from the foamable material and then mounted on the foamable material.

The present invention will become more fully apparent from the following description as it proceeds in connection with the drawings.

DETAILED DESCRIPTION OF THE PREFERRED EMBODIMENTS

Preferred embodiments of the invention will now be described in detail with reference to the drawings.

Figure 1:
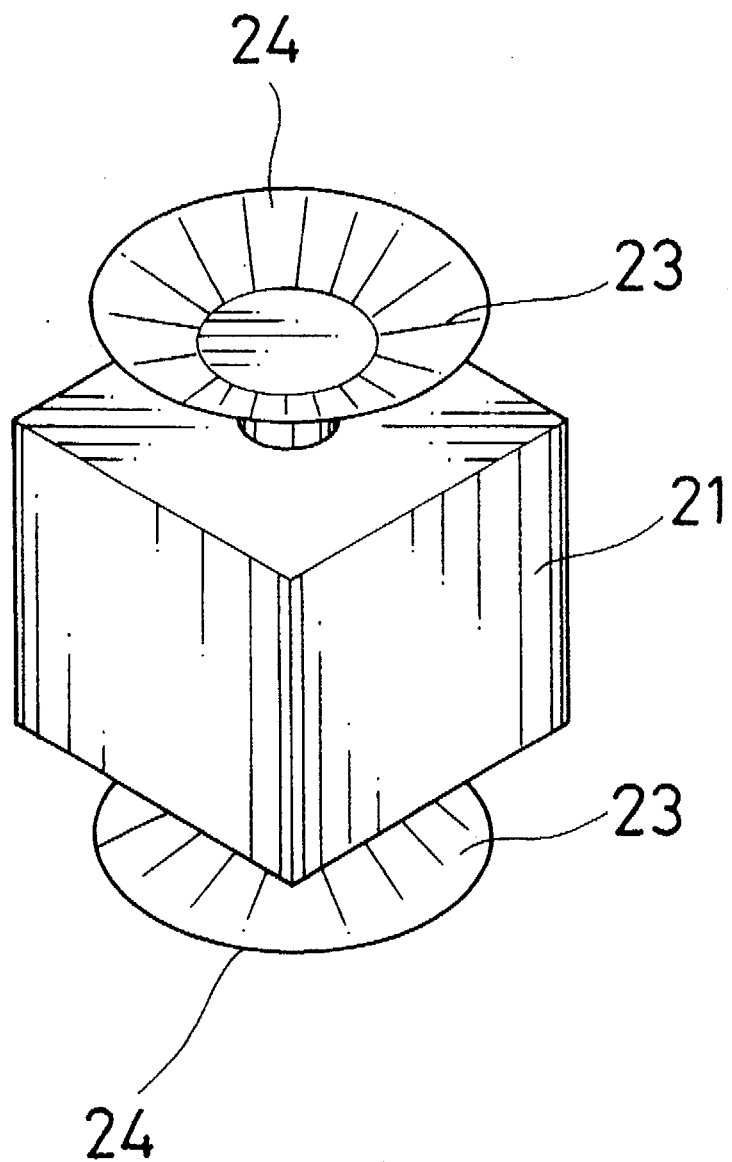
FIG. 1 is a perspective view of a foamable material with a suction disk according to a first embodiment of the present invention.
Figure 2:
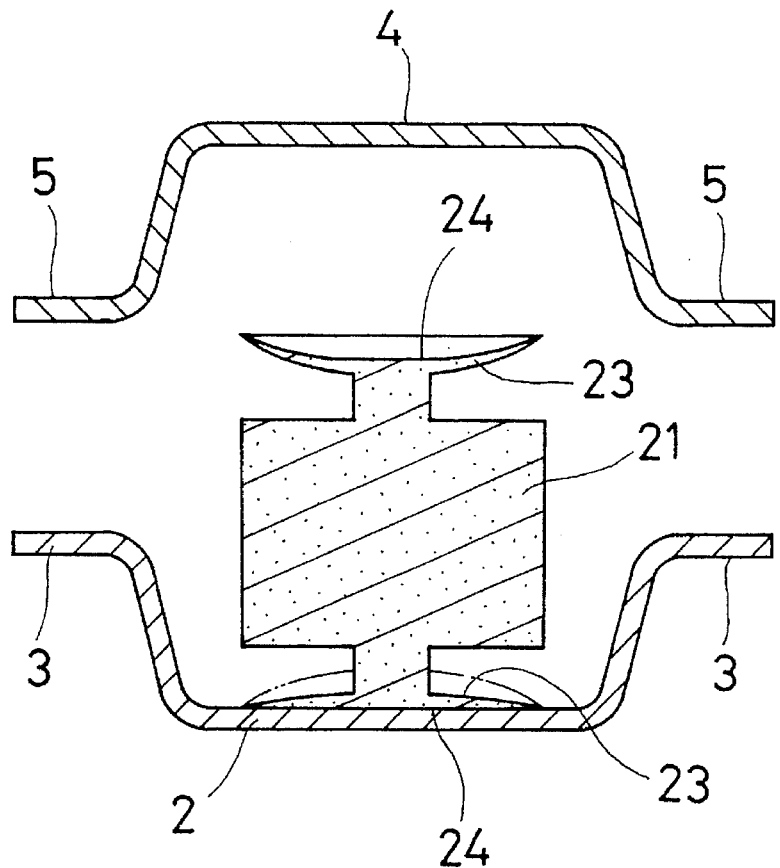
FIG. 2 is a sectional view of the foamable material arranged en an inner panel of a pillar.
Figure 3:
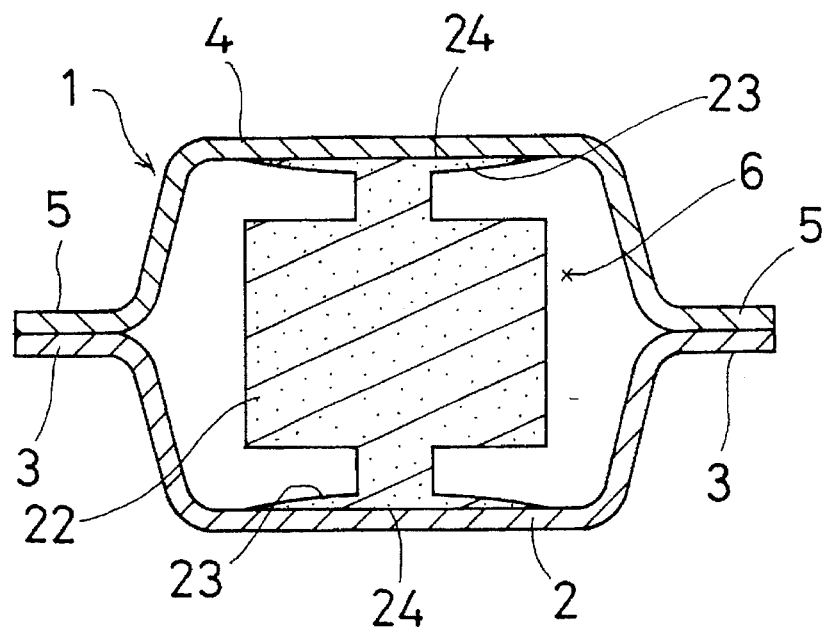
FIG. 3 is a sectional view of the foamable material supported in a cavity of the pillar.
Figure 4:
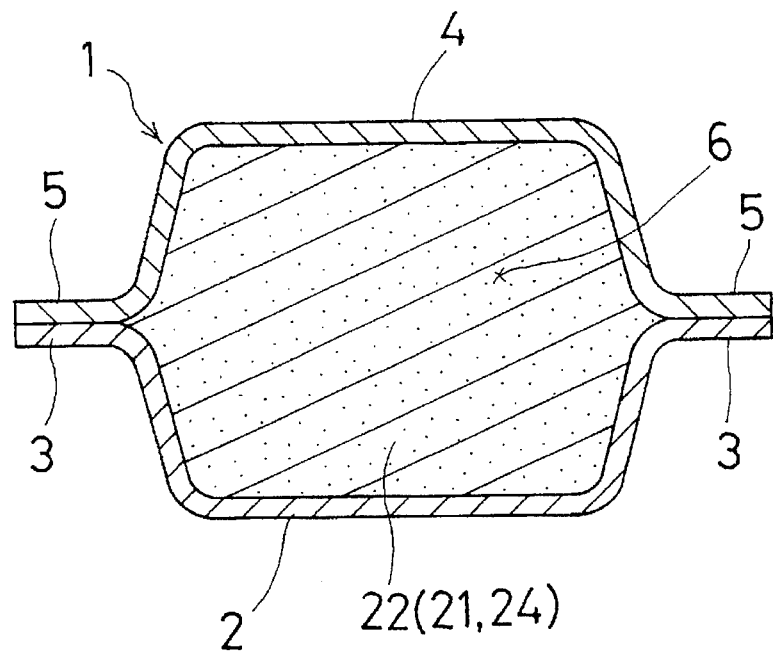
FIG. 4 is a sectional view of the foamable material supported in the cavity after it is foamed and expanded.

Referring to FIGS. 1 to 4, shown therein is a first embodiment of the invention. As shown in FIGS. 2 to 4, a pillar 1 of a vehicle body is exemplified as a hollow structural member. As best shown in FIG. 2, the pillar 1 is constituted of an inner pillar panel 2 having a flange 3 and an outer pillar panel 4 having a flange 5. The inner and the outer pillar panels 2 and 4 are welded at the flanges 3 and 5 by spot welding to form the pillar 1 into a closed box-like hollow body including a cavity 6 therein. The cavity 6 of the pillar 1 receives a foamable material 21 which blocks the cavity 6 when it is foamed and expanded by external heating. The foamable material 21 is retained by opposed sucking disks 23 integrally provided thereon.

The foamable material 21 is formed by injection molding and has a substantially rectangular parallelepipedic configuration. The foamable material 21 is made of a material, such as synthetic resin, synthetic rubber and other elastomer each containing a foaming agent, which can be foamed and cured by heat at the time the pillar 1 is heated to bake a coating material coated thereon, for example, at temperatures from 110° C. to 190° C. Such a material is disclosed, for example, in Japanese Laid-Open Patent Publication No. 2-276836.

As shown in FIG. 1, the foamable material 21 is provided with the sucking disks 23 at opposed sides thereof. One of the sucking disks 23 includes a sucking surface 24 to stick to an inner surface of the inner pillar panel 2, and the other of the sucking disks 23 includes a sucking surface 24 to stick to an inner surface of the outer pillar panel 4. The sucking disks 23 are made of the material for the foamable material 21 or other equivalent materials, and are formed integrally with the foamable material 21.

Processes for incorporating the foamable material 21 to the pillar 1 and subsequent operations will now be described.

The foamable material 21 is previously positioned at a desired position on the inner surface of the inner panel 2, and then the sucking surface 24 of one of the sucking disks 23 is forced to the inner surface of the inner panel 2. Thus, as shown in FIG. 2, the sucking surface 24 sticks to the inner surface of the inner pillar panel 2 so that the foamable material 21 is properly positioned and fixed on the inner pillar panel 2.

Subsequently, as shown in FIG. 3, the inner and the outer pillar panels 2 and 4 are welded at the flanges 3 and 5 thereof by spot welding to form the pillar 1 having the closed box-like hollow shape and encapsulating the foamable material 21 therein. As will be apparent from FIG. 3, when the inner pillar panel 2 is combined with the outer pillar panel 4 by the spot welding, the sucking surface 24 of the other one of the sucking disks 23 is forced to the inner surface of the outer panel 4 so as to stick to the inner surface of the outer pillar panel 4. Thus, the foamable material 21 is supported between the inner and the outer pillar panels 2 and 4, and is reliably fixed in the cavity 6 of the pillar 1.

Thereafter, the pillar 1 with the foamable material 21 is heated by external heating, for example, by external heating for baking the coating material coated on the automobile body. Consequently, as shown in FIG. 4, the foamable material 21 and the sucking disks 23 are simultaneously foamed and expanded to produce a foamed product 22.

When the foamable material 21 is foamed and expanded to form the foamed product 22, as shown in FIG. 4, the foamed product 22 thus produced is adhered to an inner circumferential surface of the pillar 1. Thus, the cavity 6 is effectively blocked by the foamed product 22. As a result, the pillar 1 may have increased damping powers and sound insulation powers.

Figure 5:
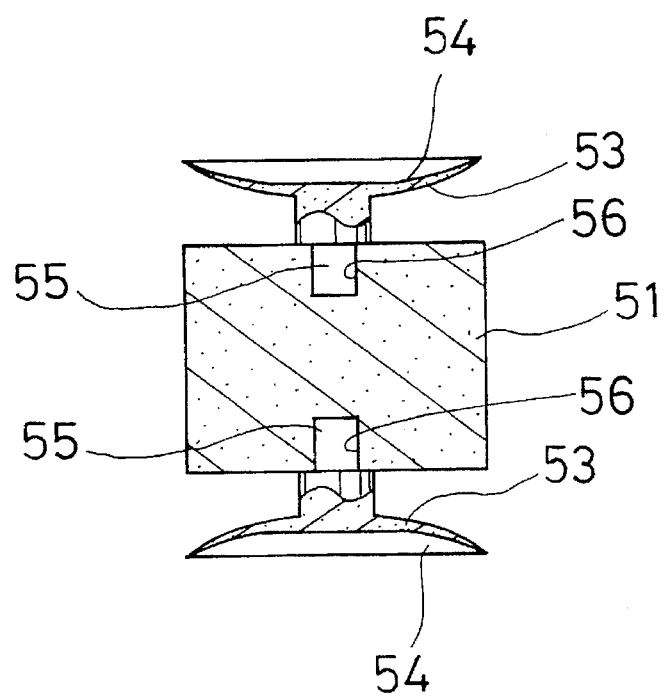
FIG. 5 is a sectional view of a foamable material with a suction disk according to a second embodiment of the present invention.
Figure 6:
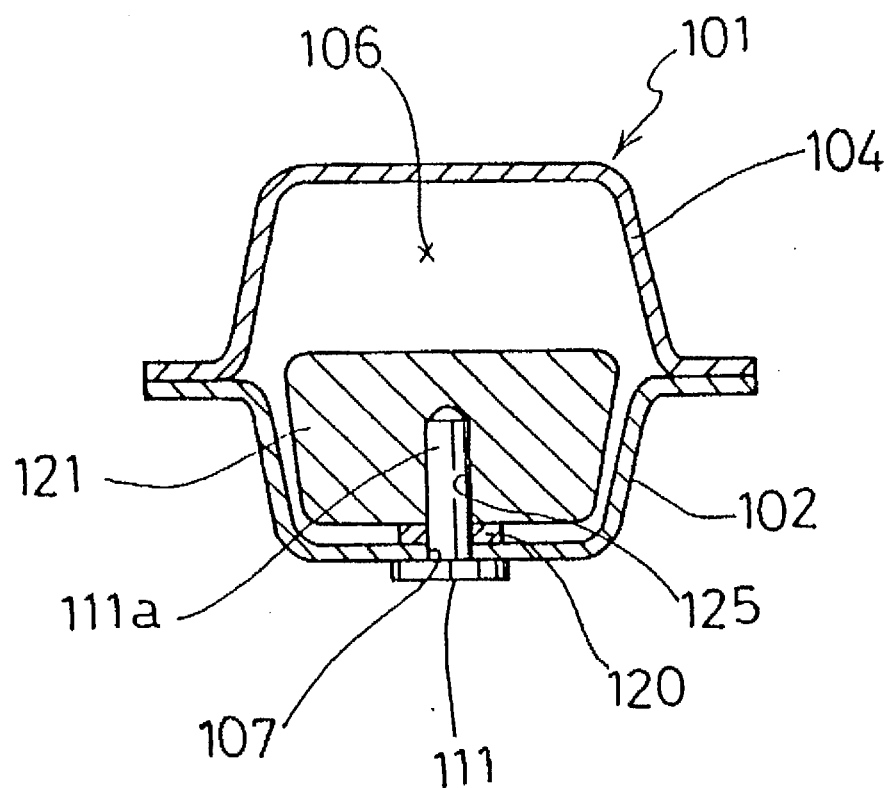
FIG. 6 is a sectional view showing a conventional support structure of a foamable material.

Referring now to FIG. 5, shown therein is a second embodiment of the invention. This embodiment is a partial modification of the first embodiment. Therefore, a construction which is different from that in the first embodiment will be explained.

In this embodiment, as shown in FIG. 5, a foamable material 51 is provided with sucking disks 53 each having a sucking surface 54 on opposed sides thereof. The foamable material 51 and each sucking disk 53 are separately formed. The foamable material 51 has mounting apertures 56 formed on the opposed sides thereof. On the other hand, each sucking disk 53 has a stepped stem 55 formed integrally thereon. As will be appreciated, each sucking disk 53 is mounted on the foamable material 51 by fitting the stepped stem 55 into the mounting aperture 56.

Like the foamable material 21 of the first embodiment, the foamable material 51 is made of a material, such as synthetic resin and synthetic rubber each containing a foaming agent, which can be foamed and cured at temperatures from 110° C. to 190° C. Each sucking disk 55 is made of the material for the foamable material 51 or other equivalent materials. However, the sucking disk 55 can be made of an unfoamable material such as unfoamable synthetic resin and unfoamabel rubber, if required.

Like the foamable material 21 of the first embodiment, the foamable material 51 of this embodiment may function so as to be reliably fixed in a cavity of a pillar. Further, the foamable material 51 is foamed and expanded to produce a foamed product, thereby effectively blocking the cavity of the pillar.

Moreover, in the first and the second embodiments, the pillar of a vehicle body is exemplified as the hollow structural member. However, the hollow structural member is not limited to the pillar and may be a rocker panel, a roof side panel, or a hood panel of a vehicle body. Further, the hollow structural member is not limited to parts of a vehicle body.

Furthermore, although, in these embodiments, the foamable material has two sucking disks on opposed sides of the foamable material, the foamable material may have only one sucking disk on one side thereof, if required. Moreover, the foamable material may have a plurality of sucking disks on each side thereof.

As described above, according to the present invention, the foamabel material can be easily secured in a desired position in the cavity without forming a mounting aperture in the hollow structural member. This may lead to reduced costs.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A support structure for supporting a foamable material on a hollow structural member, comprising:

a foamable material located in a cavity of a hollow structural member for blocking the cavity of the hollow structural member when it is foamed and expanded by external heating; and at least one suction disk provided on at least one side of said foamable material, said suction disk sticking to an inner surface of the hollow structural member so that said foamable material is fixed in the cavity of the hollow structural member.

2. The support structure as defined in claim 1, wherein said at least one suction disk is two in number, said respective suction disks being provided on opposed sides of said foamable material.

3. The support structure as defined in claim 1, wherein said at least one suction disk is formed integrally with said foamable material.

4. The support structure as defined in claim 1, wherein said at least one suction disk is formed separately from said foamable material and is then mounted on said foamable material.

* * * * *